United States Patent
Volz

[11] Patent Number: 6,032,692
[45] Date of Patent: Mar. 7, 2000

[54] ELECTROMAGNETIC VALVE, IN PARTICULAR FOR HYDRAULIC MOTOR VEHICLE BRAKING SYSTEMS WITH WHEEL SLIP REGULATION

[75] Inventor: Peter Volz, Darmstadt, Germany

[73] Assignee: ITT Manufacturing Enterprises Inc., Wilmington, Del.

[21] Appl. No.: 09/011,595
[22] PCT Filed: Jul. 27, 1996
[86] PCT No.: PCT/EP96/03320
   § 371 Date: May 4, 1998
   § 102(e) Date: May 4, 1998
[87] PCT Pub. No.: WO97/07002
   PCT Pub. Date: Feb. 27, 1997

[30] Foreign Application Priority Data
   Dec. 8, 1995 [DE] Germany ............ 195 29 724

[51] Int. Cl.[7] ............ F16K 31/02; F16K 31/40
[52] U.S. Cl. ............ 137/630.14; 137/599.2; 137/630
[58] Field of Search ............ 137/630.14, 630, 137/599.2; 251/30.02, 38, 129.07, 129.15

[56] References Cited

U.S. PATENT DOCUMENTS

| | | | |
|---|---|---|---|
| 2,866,477 | 12/1958 | Bredtschneider et al. | 137/628 |
| 2,968,464 | 1/1961 | Olson | 251/30 |
| 2,990,155 | 6/1961 | Selinder | 251/30 |
| 3,154,285 | 10/1964 | Houle | 251/30 |
| 3,797,526 | 3/1974 | Champeon | 137/630.14 |
| 4,844,119 | 7/1989 | Martinic | 137/596.17 |
| 4,922,966 | 5/1990 | Kases et al. | 137/627.5 |
| 5,076,538 | 12/1991 | Mohr et al. | 251/129.02 |
| 5,333,946 | 8/1994 | Goossens et al. | 251/129.15 |
| 5,375,623 | 12/1994 | Weber | 137/599.2 |
| 5,388,899 | 2/1995 | Volz et al. | 137/504 |
| 5,657,962 | 8/1997 | Neron et al. | 137/630 X |
| 5,673,980 | 10/1997 | Schwarz et al. | 137/599.2 X |

FOREIGN PATENT DOCUMENTS

| | | |
|---|---|---|
| 0334029 | 9/1989 | European Pat. Off. . |
| 0423755 | 4/1991 | European Pat. Off. . |
| 1926637 | 2/1972 | Germany . |
| 4030571 | 4/1992 | Germany . |
| 4112136 | 10/1992 | Germany . |
| 4211307 | 10/1993 | Germany . |
| 4236505 | 5/1994 | Germany . |
| 4419107 | 7/1995 | Germany . |
| 537952 | of 1956 | Italy ............ 137/630.14 |
| 92/18362 | 10/1992 | WIPO . |

Primary Examiner—Henry Bennett
Assistant Examiner—Joanne Y. Kim
Attorney, Agent, or Firm—Rader, Fishman & Grauer PLLC

[57] ABSTRACT

The present invention relates to an electromagnetic valve including a valve housing (2) in which a sleeve (13) housing a magnetic core (14) is inserted, including a magnetic armature (16) on which a valve closure member (7) is mounted which, in its electromagnetically non-energized initial position, under the action of a spring (15), closes a valve passage (1) between a first pressure fluid channel (11) in the valve housing (2) and at least one further pressure fluid channel (12) in the valve housing (2). The valve passage (1) is provided in a valve member (3) that is movably arranged in the valve housing (2).

9 Claims, 1 Drawing Sheet

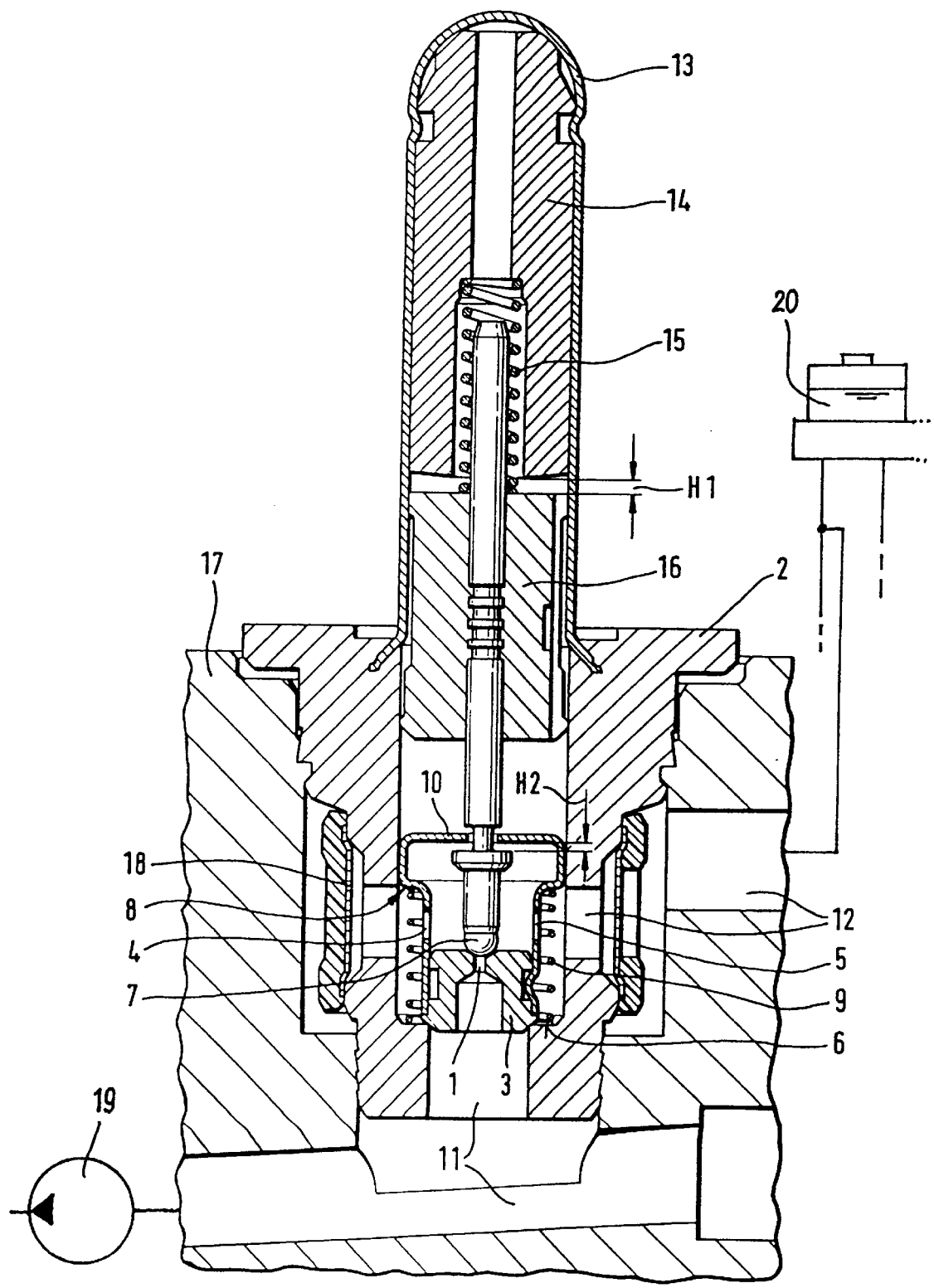

ELECTROMAGNETIC VALVE, IN PARTICULAR FOR HYDRAULIC MOTOR VEHICLE BRAKING SYSTEMS WITH WHEEL SLIP REGULATION

BACKGROUND OF THE INVENTION

The present invention relates to an electromagnetic valve, in particular for hydraulic automotive vehicle brake systems with wheel slip control.

German patent application No. 40 30 571 discloses an electromagnetic valve of the type referred to hereinabove which includes a valve housing accommodating a sleeve that houses a magnetic core. Close to the magnetic core, a magnetic armature with a valve closure member is arranged. In the electromagnetically non-energized initial position, the valve closure member closes a valve passage between a first and a second pressure fluid channel in the valve housing under the action of a compression spring. Pressure differences develop in the pressure fluid channels in the valve's closed position downstream and upstream of the valve and can impair the switching speed of the valve. Further, great differences in temperature impair the viscosity of the fluid and take influence on the operation of the valve.

Therefore, an object of the present invention is to improve upon an electromagnetic valve of the type referred to hereinabove to such effect that differential pressures and temperature effects do not impair the operability of the valve in its switching actions so that as constant and as high switching speeds of the valve as possible can be achieved.

SUMMARY OF THE INVENTION

According to the present invention, this object is achieved by an electromagnetic valve of the initially mentioned type including a valve housing in which a sleeve housing a magnetic core is inserted, a magnetic armature on which a valve closure member is mounted which, in its electromagnetically non-energized initial position, under the action of a spring, closes a valve passage between a first pressure fluid channel in the valve housing and at least one further pressure fluid channel in the valve housing, wherein the valve passage is provided in a valve member that is movably arranged in the valve housing.

Further features, advantages and favorable embodiments of the present invention will be described in detail hereinbelow, making reference to the accompanying drawing.

BRIEF DESCRIPTION OF THE DRAWING

FIG. 1 shows an electromagnetic valve which is preferably used for hydraulic automotive vehicle brake systems with wheel slip control.

DETAILED DESCRIPTION OF THE DRAWING

The embodiment of FIG. 1 discloses an electromagnetic valve which is preferably used for hydraulic automotive vehicle brake systems with wheel slip control. The electromagnetic valve includes a valve housing 2 in which a sleeve 13 is inserted.

Sleeve 13 houses a magnetic core 14 and also, in sections, a magnetic armature 16 which is radially guided and corresponds with the magnetic core 14. Provided on a tappet-shaped extension at the frontal end of the magnetic armature 16, remote from the magnetic core 14, is a valve closure member 7 which is urged against a valve member 3 under the action of a spring 15 compressed between the magnetic armature 16 and the magnetic core 14. Thereby, a valve passage 1 which extends coaxially through the valve member 3 is closed by the valve closure member 7. Subjected to the spring 15 which acts on the magnetic armature 16, the valve member 3 bears against a bore step 6 in the valve housing 2 so that there is also a contact between the valve member 3 and the valve housing 2 that is impermeable to pressure fluid. The electromagnetic valve shown in FIG. 1 adopts its electromagnetically non-energized initial position where a pressure fluid channel 11, which opens downstream of the valve (shown in the drawing), and a second pressure fluid channel 12 which opens radially upstream of the valve closure member 7, are hydraulically isolated due to the pressure-fluid closing effect of the valve closure member 7 on the valve member 3 and the pressure-fluid closing effect of the valve member 3 in relation to the valve housing 2. The first pressure fluid channel 11 preferably extends to a suction port of a pump 19, and the second pressure fluid channel 12 is connected to a pressure fluid source 20 which is configured as a hydraulic braking pressure generator with respect to the electromagnetic valve being used in a hydraulic automotive vehicle brake system. A generally sleeve-shaped entraining element 8, which is attached to the valve member 3, preferably by a sheared-in indentation, is acted upon by a compression spring 9 that is supported on the bore step 6. However, the spring force of the compression spring 9 is so rated that the electromagnetic valve remains closed in its initial position when subjected to the present force of the spring 15. The entraining element 8 has openings 4, 5 for the passage of pressure fluid. The tappet-shaped extension between the magnetic armature 16 and the valve closure member 7 includes a recess in which the entraining element 8 with a collar 10 is engaged with a play. Entraining element 8 is preferably made of a thin sheet-metal part. The play H2 provided between the collar 10 and the valve closure member 7 in the stroke direction of the magnetic armature 16 must be chosen to be smaller than the play Hi which is required due to the air slot between the magnetic core 14 and the magnetic armature 16. It is thereby ensured that when the magnetic armature 16 is electromagnetically energized after the valve passage 1 has been opened by the valve closure member 7, the entraining element 8 will perform a compulsory stroke due to the form-lock between the tappet-shaped extension and the collar 10. The compulsory stroke also causes hydraulic release of the valve seat between the bore step 6 and the valve member 3. The electromagnetic valve disclosed has a cartridge-type design. The valve housing 2 can be made of steel as a sleeve-shaped, stepped turned part, in conformity with the demands of automation. The valve is positioned and sealed to pressure fluid by way of a self-shearing connection between the valve housing 2 and a valve-accommodating member 17 made of a light metal alloy. As a protection against contaminants in the valve, an annular filter element 18 is arranged on the periphery of the valve housing 2 to prevent possible contaminants in the second pressure fluid channel 12 from propagating into the first pressure fluid channel 11. The individual elements of the electromagnetic valve described hereinabove are rotationally symmetrical and aligned coaxially to each other in terms of their geometry.

The operation of the electromagnetic valve will be explained hereinbelow. Different from the electromagnetically non-energized closed position of the valve, as shown in the embodiment of FIG. 1, the electromagnetic energization of the magnetic armature 16 by the magnetic force of a magnetic coil (not shown in FIG. 1) in the air slot H1 initially causes the valve closure member 7 to lift from the valve member 3, with the result that pressure balance occurs between the first pressure fluid channel 11 and the second pressure fluid channel 12 through the valve passage 1. When a partial stroke H2 is achieved, the collar 10 moves into positive engagement with the recess of the tappet-shaped extension so that the valve member 3 attached to the entraining element 8 is assisted by the compression spring 9 and performs a compulsory stroke, with the result that the pressure fluid is released between the bore step 6 and the valve member 3. The valve closure member 7, interacting with the valve member 3, thus performs a precontrolling function during the electromagnetic actuation of the magnetic armature 16 in order to minimize the influence of different differential pressures on the switching speed of the valve when the valve is closed. When the passage between the valve member 3 and the bore step 6 is forced to open, the effect is made use of that the pressure-balancing precontrolling function of the valve closure member 7 is possible with a relatively low magnetic force. Thus, a largely pressure-balanced valve passage position between the valve member 3 and the bore step 6 is provided with a decreasing magnetic air slot and an overproportionally increasing magnetic force (hyperbolic function). Reliable opening of the valve is thereby achieved, and the pressure fluid supply from the second pressure fluid channel 12 into the pressure fluid channel 11 to the pump is possible by clockwise energization of the valve due to the relatively constant and high switching speed. In the present case of application for the pressure fluid supply of a pump, it is an advantage that there is no need for a rotational speed control of the pump motor. Regarding the adjustment of the play H2, the construction disclosed offers a number of adjustment variations. One possibility is the adjustment of the entraining element 8 on the valve member 3 which is completed by a subsequent shearing action. An alternative is the displacement of the tappet-shaped extension in the magnetic armature 16, or the deformation of the relatively thin-walled collar 10 within the recess on the valve closure member 7.

Concluding, the basic constructional features of the electromagnetic valve will be pointed out in the following:

The features are:

the valve passage 1 is provided in a valve member 3 that is movably arranged in the valve housing 2, the valve member 3 abuts and seals a bore step 6 of the valve housing in its initial position where the pressure fluid channels 4, 5 are separated, remote from the bore step 6, the valve closure member 7 in its initial position abuts and seals the valve passage 1 in the valve member 3, at the periphery of the valve member 3, a generally sleeve-shaped entraining element 8 is attached, bearing against which is a compression spring which is supported on the bore step 6, the valve member 3, the entraining element 8 as well as the valve closure spring 7 and the spring 9 are arranged concentrically relative to the bore step, the entraining element 8 includes a collar 10 which is in positive engagement with the valve closure member 7 when the valve is electromagnetically energized, the first pressure fluid channel 11 is connected to the suction side of a pump, and the second pressure fluid channel is connected to a pressure fluid source, preferably, a braking pressure generator of a hydraulic automotive vehicle brake system with wheel slip control.

List of Reference Numerals
1 valve passage
2 valve housing
3 valve member
4 pressure fluid passage openings
5 pressure fluid passage openings
6 bore step
7 valve closure member
8 entraining element
9 compression spring
10 collar
11 first pressure fluid channel
12 second pressure fluid channel
13 sleeve
14 magnetic core
15 spring
16 magnetic armature
17 valve-accommodating member
18 annular filter element

I claim:

1. An electromagnetic valve including a valve housing in which a sleeve is inserted housing a magnetic core, a magnetic armature on which a valve closure member is mounted which has an electromagnetically non-energized initial position which under the action of a spring, closes a valve passage between a first pressure fluid channel in the valve housing and at least one further pressure fluid channel in the valve housing, wherein the valve passage is provided in a valve member that is movably arranged in the valve housing and further wherein a generally sleeve-shaped entraining element is attached to a periphery of the valve member and a compression spring is supported on a bore step of the valve housing and bears against the sleeve-shaped entraining element.

2. Electromagnetic valve as claimed in claim 1,
wherein the valve member, in its initial position, abuts and seals a bore step of the valve housing where the pressure fluid channels are separated.

3. Electromagnetic valve as claimed in claim 2,
wherein, remote from the bore step, the valve closure member in its initial position abuts and seals the valve passage in the valve member.

4. Electromagnetic valve as claimed in claim 2,
wherein the valve member, along with the entraining element, as well as the valve closure member and the compression spring are arranged concentrically relative to the bore step.

5. Electromagnetic valve as claimed in claim 2,
wherein the entraining element includes a collar which is in positive engagement with the valve closure member when the valve is electromagnetically energized.

6. Electromagnetic valve as claimed in claim 1,
wherein the first pressure fluid channel is connected to the suction side of a pump, and one of the further pressure fluid channels is connected to a pressure fluid source.

7. Electromagnetic valve as claimed in claim 1,
wherein the entraining element is attached to the valve member by a sheared-in indentation.

8. Electromagnetic valve as claimed in claim 1,
wherein the entraining element is made of thin sheet metal.

9. Electromagnetic valve as claimed in claim 1,
wherein the entraining element has openings for the passage of fluid.

* * * * *